3,523,912
PREPARATION OF MULTICOMPONENT CATALYSTS
Joseph Jaffe, Berkeley, Calif., assignor to Chevron Research Company, San Francisco, Calif., a corporation of Delaware
No Drawing. Continuation-in-part of application Ser. No. 568,760, July 29, 1966, which is a continuation-in-part of application Ser. No. 369,583, May 22, 1964. This application Aug. 30, 1968, Ser. No. 756,396
The portion of the term of the patent subsequent to Oct. 18, 1983, has been disclaimed
Int. Cl. B01j *11/74, 11/78*
U.S. Cl. 252—439          5 Claims

ABSTRACT OF THE DISCLOSURE

Method of producing a multicomponent hydrocarbon conversion catalyst comprising coprecipitating a mixture of at least three different metal compounds at a pH of 5.5 to 8, at least one of said compounds being a metal chloride, reducing the chloride content of the coprecipitate to below about 0.25 percent of the total weight thereof, drying the coprecipitate, and heat treating the dried coprecipitate by contact with an oxygen-containing gas at 850° to 1600° F. for 0.25 to 48 hours.

RELATED APPLICATIONS

This application is a continuation-in-part of copending Joseph Jaffe application Ser. No. 568,760, for "Method of Making Multicomponent Catalysts," filed July 29, 1966, now U.S. Pat. 3,401,125, which in turn is a continuation-in-part of application Ser. No. 369,583, filed May 22, 1964, now U.S. Pat. 3,280,040.

INTRODUCTION

This invention relates to a method for producing solid, coprecipitated mixtures containing at least one metal oxide and also having a minimum of three components, all of said components having been coprecipitated simultaneously.

As is well known to those skilled in the catalyst art, a gel, including both xerogels and aerogels, is produced by dehydration, generally by heating, of a hydrogel or gelatinous precipitate. A hydrogel can be defined as a rigid material containing a continuous phase of a network of colloidal particles and an imbided liquid phase. A gelatinous precipitate is similar to a hydrogel, but without the characteristic of a rigid structure. It is also well known that metal oxide-containing gels have long been employed as catalysts and/or catalyst supports. Numerous methods of making such composites have been suggested, most of which have been directed to the particular components of the initial gel, the manner of forming the gel, and in various techniques for removing undesirable components from the formed gel.

OBJECTS

An object of the present invention is to provide a process for producing catalysts, particularly hydrocracking and denitrification catalysts, that have unusually high activity for their intended purposes. Another object is to provide a process for manufacturing certain catalysts of greater regenerability than other similar catalysts. Further objects will be apparent from the disclosures herein.

STATEMENT OF INVENTION

The present invention is directed to a method for producing a coprecipitated solid containing at least one metal oxide and having a minimum of three components therein, said components having been coprecipitated simultaneously, which comprises the steps:

(a) Coprecipitating a mixture of at least three different metal compounds at a pH of from about 5.5 to about 8, said mixture having all of the following characteristics:

(1) said mixture being a solution or a sol,
(2) at least one of said metal compounds being a compound of a metal whose solid oxide has catalytic isomerization activity, alone or in admixture with a different metal compound,
(3) at least one of said metal compounds being a compound of a metal, the sulfide, oxide or metal form of which has catalytic hydrogenation activity,
(4) at least one of said metal compounds being a metal chloride;

(b) Reducing the chloride content of the resulting coprecipitate to below about 0.25 percent of the total weight thereof; and (c) Drying the resulting coprecipitate to produce said coprecipitated solid;

(d) Heat treating said coprecipitated solid by contact with an oxygen-containing gas stream at a temperature of 850° to 1600° F. for 0.25 to 48 hours.

PRIOR ART PARTIAL IMPREGNATION METHODS CONTRASTED

As indicated, the present method, requiring the simultaneous coprecipitation of the hydrogel composite, produces a gelatinous material containing at least three different precipitated metal compounds. This must be contrasted with the method of preparing a three-component solid composite as, for example, by cogelling only two metal compounds, dehydrating the two-component coprecipitate, and thereafter disposing a third metal component onto the coprecipitate by such conventional techniques as impregnation or sublimation. Although additional metal components can be impregnated upon the coprecipitate composite produced by dehydration of the hydrogel of the present process if desired, it is required that this initial coprecipitate be composed of at least three different metal compounds.

ADVANTAGES OF PROCESS OF PRESENT INVENTION

A major reason for the simultaneous coprecipitation is that it has been found that the catalysts produced in this manner are very much superior to three-component catalysts produced by such other methods as by dual impregnation of a single oxide support, or even those made by impregnating a third component on a coprecipitated two-component carrier. This marked superiority has been exemplified in the comparison of numerous catalysts. For example, three-component hydrocracking catalysts prepared according to the present method have been found to possess higher catalyst activities, lower fouling rates, and better selectivities than catalysts of similar composition prepared by other methods. The reasons for this superiority are not completely understood, but it is believed that the reduction of trace contaminants, with perhaps a different and more favorable association of the catalytic functions than heretofore obtained, leads to these improved results.

MIXTURE OF THREE DIFFERENT METAL COMPOUNDS IN SOLUTION OR SOL FORM

In addition to the requirement that at least three different metal compounds be present in the initial mixture, a number of additional restrictions as to the character of these compounds must be met. These compounds must be such that when admixed together, the resulting mixture is in the form of a solution and/or a sol, so as to attain uniform dispersion throughout the mixture.

AT LEAST ONE COMPOUND OF A METAL WHOSE SOLID OXIDE HAS CATALYTIC ISOMERIZATION ACTIVITY

Further, the present method requires that at least one of the initial metal salts (that will subsequently be converted to the corresponding oxide by dehydration of the coprecipitate) be a compound of a metal whose solid oxide, alone or in admixture with a different metal compound, possesses catalytic isomerization activity. Such activity is almost universally dependent upon the particular metal oxide being acidic in character. Although a number of metal oxides, alone or in admixture with a different metal compound, possess this isomerization activity, a compound of aluminum has been found to be particularly effective for use in the subject method, because alumina alone and in combination with at least one compound of at least one different metal has the desired isomerization activity. Some metal oxides do not possess the desired isomerization activity alone, but can be combined with at least one other metal oxide to produce a mixture having high isomerization activity. For example, silica alone has essentially no isomerization activity, but when combined with alumina, magnesia, zirconia, titania, thoria, hafnia, or the like, the mixture has high isomerization activity. Accordingly, in the present process an aluminum salt should be employed in the initial mixture, or a combination of at least two of the following metal salts: aluminum, magnesium, silicon, titanium, thorium, zirconium, hafnium, and such rare earths as cerium, samarium, and europium. Preferred combinations are silica-alumina, silica-alumina-titania, silica-alumina-zirconia, and silica-magnesia, with silica-alumina-titania being especially preferred. Preferably the silica content of the catalyst will be below 35 weight percent, based on the total catalyst.

AT LEAST ONE COMPOUND OF A METAL, THE SULFIDE, OXIDE OR METAL FORM OF WHICH HAS HYDROGENATION ACTIVITY

In addition to the use of at least one salt of a metal whose solid oxide, alone or in admixture with a different metal compound, possesses catalytic isomerization activity, it is required that the initial mixture contain at least one metal compound precursor of a Group VI and/or Group VIII metal, metal sulfide, and/or metal oxide hydrogenating component of the final catalytic material. Preferably, at least one salt of the Group VI or Group VIII metals is used in the initial mixture in the present process. At least one salt of a Group VI metal may be used together with at least one salt of a Group VIII metal, to produce highly desirable catalysts containing, for example, as such or in the form of compounds, nickel and molybdenum and nickel and tungsten.

When it is desired to produce by the present method a catalyst comprising nickel or a compound thereof in combination with silica-alumina, an unsually active catalyst can be made by including a tin salt, e.g., stannous chloride, in the initial mixture. It has been found that tin or a compound thereof in the final catalyst increases the hydrogenation activity of the nickel or nickel compound, or at least that the combination has greater hydrogenation activity than nickel or a nickel compound alone.

AT LEAST ONE METAL CHLORIDE

The requirement that at least one of the metal components in the initial mixture be a metal chloride presents somewhat of an anomaly inasmuch as a subsequent step in the preparation involves the reduction of the chloride level below about 0.25 percent of the total weight of the final coprecipitate. This anomaly resides in the fact that it has been found that chloride, in addition to certain other components such as sulfates and alkali metal compounds, have a deleterious effect upon the activity, regenerability, and/or the fouling rate of a number of catalysts. However, in view of the process advantages of using chloride salts due to their readiness to form solutions with other metal compounds, their commercial availability and relatively low price, it is often desirable to employ them. Thus, the present invention requires that at least one of the metal salts in the initial mixture be a chloride while also requiring that the chloride level of the final coprecipitate be reduced to below 0.25 percent by weight, and preferably below about 0.1 percent by weight, of the final composite.

A COMPOUND OF TITANIUM

When titanium, in the metal, oxide or sulfide form, is present in the final catalyst prepared by the process of the present invention as a result of the presence of a compound thereof in the initial mixture, it has been found that catalyst activity is significantly higher than when titanium or zirconium in one of these forms is not present. The titanium, or compound thereof, preferably is present in the final catalyst in the amount of 3 to 15% by weight, based on the total catalyst. The higher activity is noted for both dentrification, in the case of dentrification catalysts, and for hydrocracking, in the case of hydrocracking catalysts. The higher activity can be obtained by using zirconium instead of titanium. However, it has been found most unexpectedly that, while zirconium and titanium are essentially equivalent for purposes of activity enhancement of the final catalyst, (a) the catalyst has only moderately good regeneration characteristics when it contains zirconium or a compound thereof, but no titanium or compound thereof, but (b) the catalyst has most excellent regeneration characteristics when it contains titanium or a compound thereof. Accordingly, it is preferred for purposes of the present invention that a compound of titanium be present in the initial mixture. A compound of zirconium also may be present if desired.

TIN OR A COMPOUND THEREOF

When tin, in the metal, oxide or sulfide form, is present in the final catalyst prepared by the process of the present invention, as a result of the presence of a compound of tin in the initial mixture, it has been found that compared with the same catalyst with no tin present: (a) the cracking activity is higher, in the case of a hydrocracking catalyst; (b) the hydrogenation activity is higher, in the case of both hydrocracking and hydrofining catalysts, and particularly in the case of a hydrocracking catalyst comprising nickel or a compound thereof and silica-alumina; and (c) the hydrogenation activity can be controlled in an essentially reversible manner by varying the amount of sulfur present in the hydrocarbon feed. The tin or compound thereof preferably is present in the amount of 1 to 30%, preferably 2 to 15%, by weight, based on the total catalyst.

MOLECULAR SIEVE COMPONENT

The process of the present invention is especially useful for preparing catalysts containing a molecular sieve component in intimate admixture with the other catalyst components. The molecular sieve component may be added, in any desired proportions, preferably 1 to 50% by weight, more preferably 2 to 20% by weight, based on the total finished catalyst.

REPRESENTATIVE CATALYSTS

Especially useful catalysts that can be made by the process of the present invention are those having the following combinations of components, the catalysts being useful in the metallic, oxide or sulfide forms:

(1) Ni, W, Ti, $SiO_2$-$Al_2O_3$ alone or with added molecular sieves.

(2) Ni, Ti, $SiO_2$–$Al_2O_3$ alone or with added molecular sieves.
(3) Ni, Sn, Ti, $SiO_2$–$Al_2O_3$ alone or with added molecular sieves.
(4) Pd, Ti, $SiO_2$–$Al_2O_3$ alone or with added molecular sieves.
(5) Ni, Mo, Ti, $Al_2O_3$.
(6) Ni, W, Ti, $Al_2O_3$.
(7) Ni, W, Ti, Sn, $Al_2O_3$.
(8) Ni, Ti, Mo, $SiO_2$–$Al_2O_3$ alone or with added molecular sieves.
(9) Pd, Mo, Ti, $Al_2O_3$.

MISCELLANEOUS CATALYST PREPARATION CONSIDERATIONS

Any of the catalysts prepared by the present process may be fluorided by conventional methods if desired.

As noted above, it is often preferred that at least a portion of the initial mixture be in the form of a sol. For example, it is generally desirable to employ silica sols when silica is to be a component of the coprecipitate. In such a case, the silica sol can be made by any conventional procedure. A number of methods for producing such a sol are known to those skilled in the art. Thus, silica sols can be made by hydrolyzing tetraethyl orthosilicate with an equeous HCl solution, or in the presence or absence of solvents, such as alcohols containing 1 to 4 carbon atoms per molecule, acetone, methylethyl ketone, and the like. Likewise, silica sols can be prepared by contacting silicon tetrachloride with a cold methanol and water solution, or with 95% ethyl alcohol, or with cold water or ice. Also, silica sols can be made by contacting sodium silicate with an ion exchange resin to remove the sodium, or by contact with an acid at a pH of about 2.5 or less. Likewise, if alumina is a desored component of the final coprecipitate, it is entirely feasible to employ alumina sols in the initial mixture. A sol of hydrous alumina can be prepared by reacting aluminum metal with dilute hydrochloric acid or with aluminum chloride solution, with or without a catalyst. Also, alumina sols can be prepared by reacting aluminum metal with a weak acid, such as formic or acetic acid.

As discussed above, at least one of the components of the initial mixture must be a metal chloride, and often it is desirable to incorporate at least one sol, such as a silica or alumina sol, in this mixture. Other metal salts can also be present. Suitable salts are the nitrates, citrates, formates, alcoxides and carbonates. Preferably, the acetates are employed. Sulfates are feasible but are often not desirable because of the adverse effect that sulfates have on some desirable catalyst qualities such as activity and/or fouling rate. If it is desired that silica be present, the silica component can also be derived from sodium silicate, tetraethyl orthosilicate, silicon tetrachloride, and potassium silicate.

Following formation of the initial mixture, it is then coprecipitated, at a pH between about 5.5 and about 8, by conventional techniques. Thus, the initial mixture, if acidic, can be precipitated by the addition of a base. If the mixture is basic, it can be precipitated with an acid. The precipitation can be stepwise, as by a form of titration, or simultaneous, as by mixing of metered solutions in the proper ratios. It is apparent from the above discussion that any precipitating agent should preferably not introduce any components in the mixture that are deleterious, i.e., sulfate or excess alkali, although chloride can be introduced if necessary, since the chloride content of the coprecipitate will be subsequently reduced by washing and anion exchange.

As an example of a conventional precipitation procedure employed in producing a silica-alumina-metal containing coprecipitate, sodium silicate can be dispersed into a solution of aluminum and metal chlorides containing an excess of acid, such as acetic acid, HCl, $HNO_3$, etc., to form a silica sol in the presence of dissolved metals. Ammonia can then be added to the mixture to coprecipitate the component hydrous oxides at a pH of from about 5.5 to 8. Precipitation of an acidic initial mixture with ammonia, as exemplified, is a preferred technique of the present method.

Following precipitation of the hydrous oxides, the excess liquid is removed, as by filtration. The resulting solid cake, still essentially composed of hydrous oxides, is then treated to remove impurities and to reduce the chloride content to the required level, for example by washing and ion exchange. Washing can be done in one or more steps, using water or dilute aqueous solutions of ammonium salts of weak organic acids having a Dissociation Constant K of $10^{-4}$ or less. Said salts include ammonium formate, ammonium acetate, ammonium propionate and ammonium butyrate. Ammonium acetate is preferred. Salts of stronger organic acids are unsatisfactory because the resulting lower pH causes leaching out of valuable metals. Salts of organic acids should be used because organic acids are more decomposable than inorganic acids. During or after washing and recovery of the filter cake, the latter is preferably ion exchanged in the presence of formate ion, acetate ion, propionate ion, butyrate ion, or other similar organic ion derived from ammonium salts of weak organic acids having a Dissociation Constant K of $10^{-4}$ or less. The exact function of the formate, acetate or other ion during the anion exchanging step is unknown, but, when compared to catalysts prepared by coprecipitation methods where there is no such ion present during the exchanging operation, there is no doubt that the presence of the ion leads to catalysts having superior activities, regenerability and/or fouling rates. With catalysts containing certain components, as for example nickel, molybdenum and tungsten, the presence of the ion apparently provides a buffering action at a pH of 6 or 7 which minimizes the loss of soluble metals during washing and/or anion exchange of the coprecipitate. In the case of acetate ion, for example, the ion can be introduced by acidifying with acetic acid or by employing soluble metal acetates, or in the washing liquid employed to wash the coprecipitate, or, for the first time, by employing ammonium acetate as the anion exchanger. Preferably, the ion is introduced into the initial mixture and also is present in the wash water in the washing step and also in any subsequent ion exchange step.

The treatment of the anhydrous oxides following precipitation (bearing in mind the requirement discussed above with respect to the presence of acetate or similar ion) in order to prepare a solid composite suitable for use as a catalyst, follows practices known in the art insofar as the actual steps of washing, anion exchange and aging are concerned. In any case, the finally washed, ion exchanged and filtered cake of coprecipitate is then dried, as for example in air or inert gases, at a temperature of from about 150° to 300° F. The coprecipitate is then calcined, generally at a temperature of from about 750° to 1100° F., in the present of an oxygen-containing gas. In catalysts wherein the hydrogenating component is at least one metal or compound of molybdenum, tungsten, nickel or cobalt incorporated within a coprecipitate containing silica as a component, for example silica in admixture with alumina and titania, it is preferred to thermactivate (heat treat) the calcined composite by contact with an oxygen-containing gas stream at a temperature of from about 850° to 1600° F., preferably 1200° to 1600° F., more preferably 1250° to 1400° F., for a period in excess of about 0.25 hours, preferably 0.25 to 48 hours. Said oxygen-containing gas stream may be air, and preferably is dried in a convenient manner to reduce the moisture content thereof a substantial amount compared with ambient air. The thermactivation treatment has been found to optimize the activity of such catalysts.

EXAMPLES

The following examples will further illustrate the process of the present invention and various advantages thereof.

Examples of preparation of hydrofining catalysts using titanium compound according to process of present invention, compared with similar preparation method using a zirconium compound instead of a titanium compound, and characteristics and use of fresh and regenerated catalysts so prepared (A) PREPARATION

| Catalyst 1 (Comparison catalyst) | | Catalyst 2 (Prepared by present process) | |
|---|---|---|---|
| (a) Acidic solutions | | | |
| Solution IA components | Parts by wt. of sol. IA | Solution IIA components | Parts by wt. of sol. IIA |
| NiCl$_2$ | 33.1 | NiCl$_2$ | 33.1 |
| AlCl$_3$ | 79.8 | AlCl$_3$ | 79.8 |
| ZrOCl$_2$ | 8.1 | ZrOCl$_2$ | None |
| TiCl$_4$ | None | TiCl$_4$ | 13.3 |
| (Na$_2$O)(3.3SiO$_2$) | 25.1 | (Na$_2$O)(3.3SiO$_2$) | 25.1 |
| Acetic acid | 53 | Acetic acid | 53 |
| H$_2$O | 2074 | H$_2$O | 2069 |
| (b) Alkaline solutions | | | |
| Solution IB components | Parts by wt. of sol. IB | Solution IIB components | Parts by wt. of sol. IIB |
| WO$_3$ | 25.3 | WO$_3$ | 25.3 |
| NaOH | None | NaOH | 7.5 |
| NH$_4$OH | 108 | NH$_4$OH | 108 |
| H$_2$O | 823 | H$_2$O | 815.5 |

(c) Mixture of acidic and alkaline solutions

Solutions IA and IIA, acidic solutions of metals and sodium silicate, were neutralized with alkaline tungsten Solutions IB and IIB, respectively, by mixing Solution IA with Solution IB, and by mixing Solution IIA with Solution IIB. Each mixture was a gel slurry with a pH of about 7.0. In each case the gel was filtered, dried to about 70% volatiles, formed into 1/8″ diameter particles, washed and ion exchanged with 1% ammonium acetate solution to reduce the sodium and chloride contents to a low level, including less than 0.25 weight percent chloride, dried and calcined at 950° F.

(B) COMPOSITION OF FINAL FRESH CATALYST, PRIOR TO SULFIDING

| Catalyst 1 | | Catalyst 2 | |
|---|---|---|---|
| Component | Wt. percent of total catalyst | Component | Wt. percent of total catalyst |
| NiO | 19.1 | NiO | 19.1 |
| WO$_3$ | 25.3 | WO$_3$ | 25.3 |
| ZrO$_2$ | 5.6 | TiO$_2$ | 5.6 |
| Al$_2$O$_3$ | 30.5 | Al$_2$O$_3$ | 30.5 |
| SiO$_2$ | 19.5 | SiO$_2$ | 19.5 |

(C) Area and pore volume of final fresh catalyst, prior to sulfiding

| | Catalyst 1 | Catalyst 2 |
|---|---|---|
| Area, m.$^2$/gram | 299 | 360 |
| Pore volume, cc./gram | 0.39 | 0.353 |

(D) Sulfiding

Fresh Catalysts 1 and 2 each were sulfided with dimethyl disulfide in a conventional manner.

(E) Use of fresh sulfided Catalysts 1 and 2 for hydrofining

Fresh Catalysts 1 and 2 were used in separate runs to hydrofine a Midway gas oil with a boiling range of 500°–900° F., containing 3000 p.p.m. organic nitrogen. Each run was conducted at 0.5 LHSV, 1400 p.s.i.g., and a hydrogen exit gas rate of 3600 s.c.f. per barrel of gas oil feed, on a once-through oil and hydrogen basis. The organic nitrogen content of the liquid product was maintained at 0.3 p.p.m. by adjustment of catalyst temperature, which was required to be 755°–757° F. at the start of the runs.

(F) Catalyst fouling rate, ° F. per hour, during runs of (E)

Run with Catalyst 1 _____ 0.026
Run with Catalyst 2 _____ 0.035

(G) Regeneration

Catalysts 1 and 2, after being used until regeneration was required, each were regenerated with an oxygen-containing gas in a conventional manner.

(H) AREA AND PORE VOLUME OF REGENERATED CATALYST, PRIOR TO SULFIDING

| | Catalyst 1 | Catalyst 2 |
|---|---|---|
| Area, m.$^2$/gram | 204 | 227 |
| Pore volume, cc./gram | 0.351 | 0.325 |

(I) Sulfiding

Regenerated Catalysts 1 and 2 were resulfided with dimethyl disulfide in a conventional manner.

(J) Use of regenerated sulfided Catalysts 1 and 2 for hydrofining

Regenerated and resulfided Catalysts 1 and 2 were used in separate runs to hydrofine the Midway gas oil described under (E), under the conditions described under (E), except for starting temperature, with the organic nitrogen content of the liquid product again being maintained at 0.3 p.p.m. by adjustment of catalyst temperature, which was required to be 758°–761° F. at the start of the runs.

(K) Catalyst fouling rate, ° F. per hour, during runs of (J)

Run with regenerated Catalyst 1 _____ 0.075
Run with regenerated Catalyst 2 _____ 0.043

From the foregoing it will be noted that the catalyst containing titania had a much lower fouling rate after regeneration than did the catalyst containing zirconia, although in the fresh state each was an excellent hydrofining catalyst.

Examples of preparation of hydrocracking catalyst using process of present invention, and characteristics and use of fresh and regenerated catalysts so prepared (A) Preparation A hydrocracking catalyst, Catalyst 3, was prepared in exactly the same manner as Catalysts 1 and 2, except that the two starting solutions were as follows:

CATALYST 3

(a) Acidic solution

| Solution components: | Parts by wt. of solution |
|---|---|
| NiCl$_2$ | 22 |
| AlCl$_3$ | 78.5 |
| TiCl$_4$ | 23.7 |
| (Na$_2$O) (3.3 SiO$_2$) | 44.7 |
| Acetic Acid | 50 |
| H$_2$O | 2065 |

| Component: | Parts by wt. of total catalyst |
|---|---|
| (b) Alkaline solution | |
| $WO_3$ | 12.6 |
| NaOH | 3.8 |
| $NH_4OH$ | 105 |
| $H_2O$ | 702 |
| (B) Composition of final fresh Catalyst 3 prior to sulfiding | |
| NiO | 12.7 |
| $WO_3$ | 12.6 |
| $TiO_2$ | 10 |
| $Al_2O_3$ | 30 |
| $SiO_2$ | 34.7 |
| (C) Area and pore volume of final fresh Catalyst 3 prior to sulfiding | |
| Area, m.²/gram | 329 |
| Pore volume, cc./gram | 0.369 |

(D) Sulfiding

Catalyst 3 was sulfided with dimethyl disulfide in a conventional manner.

(E) Use of fresh sulfide Catalyst 3 for hydrocracking

Fresh Catalyst 3 was used to hydrocrack, without prior hydrofining, an Arabian gas oil with a boiling range of 650°–1000° F., containing 600 p.p.m. organic nitrogen. The hydrocracking conditions were 1.5 LHSV, 1200 p.s.i.g. hydrogen exit gas rate of 6000 s.c.f. per barrel of gas oil feed, on a once-through oil and hydrogen basis, at a constant conversion of 50% per pass to products boiling below 650° F., the conversion being obtained at the start with a catalyst temperature of 741° F., and being maintained by subsequent adjustment of catalyst temperature.

(F) Catalyst fouling rate, ° F. per hour, of fresh Catalyst 3 during run of (E)

0.032.

(G) Regeneration

Catalyst 3, after being used until regeneration was required, was regenerated with an oxygen-containing gas in a conventional manner.

(H) Area and pore volume of regenerated Catalyst 3 prior to sulfiding

Area, m.²/gram _____ 282
Pore volume, cc./gram _____ 0.332

(I) Sulfiding

Regenerated Catalyst 3 was resulfided with dimethyl disulfide in a conventional manner.

(J) Use of regenerated sulfided Catalyst 3 for hydrocracking

Regenerated and resulfided Catalyst 3 was used to hydrocrack, without prior hydrofining, the Arabian gas oil described under (E), under the conditions described under (E), except for starting temperature, with the conversion again being maintained at 50% per pass to products boiling below 650° F., the conversion being obtained at the start with a catalyst temperature of 743° F., and being maintained by subsequent adjustment of catalyst temperature.

(K) Catalyst fouling rate, ° F. per hour, of Regenerated Catalyst 3 during run of (J)

0.025.

From the foregoing it may be seen that regenerated Catalyst 3 had a lower fouling rate than when it was fresh, and was able to accomplish the same per-pass conversion of the feed at a starting temperature only 2° F. higher than when it was fresh. Catalyst 3 regenerated better than Catalyst 2, in that upon regeneration the fouling rate of Catalyst 2 was higher than when Catalyst 2 was fresh, because of the higher titania content of Catalyst 3. In any case, the titania apparently serves a dual purpose—it hinders the growth of metal crystallites while the catalyst is in service, and acts during regeneration as an oxidation catalyst to promote combustion of carbonaceous deposits.

As has been described and exemplified above, the present catalyst preparation method is particularly suitable for producing hydrofining, i.e., hydrodenitrification and hydrodesulfurization, catalysts and for producing hydrocracking catalysts. The specific conditions for conducting these various reactions are well known in the art. However, these reactions have many features in common and are herein generically termed "hydroprocessing reactions." These reactions all are directed to the conversion of hydrocarbonaceous material and are conducted in the presence of added hydrogen since these reactions will all consume at least 250 s.c.f. of hydrogen per barrel of feed contacted. The reaction temperatures will be in the range of from about 500° to 1000° F., preferably from about 500° to 900° F., and reaction pressures will be in the range of from about 200 to over 3000 p.s.i.g., and preferably in the range of from about 300 to 2500 p.s.i.g., depending upon the particular feed employed. Feed rates will generally be in the range of from about 0.1 to 10.0 LHSV. Accordingly, catalysts prepared by the subject method are especially suited for use in such hydroprocessing reactions.

Although a number of catalysts made according to the present invention have been exemplified, it is apparent that variations could be made in the present method without departing from the spirit of the invention, and all such variations that fall within the scope of the appended claims are intended to be embraced thereby.

What is claimed is:

1. A method for producing a coprecipitated solid containing at least one metal oxide and having a minimum of three components therein, said components having been coprecipitated simultaneously, which comprises the steps:
   (a) coprecipitating a mixture of at least three different metal compounds at a pH of from about 5.5 to about 8, said mixture having all of the following characteristics:
      (1) said mixture being a solution or a sol,
      (2) at least one of said metal compounds being a compound of a metal whose solid oxide has catalytic isomerization activity, alone or in admixture with a different metal compound,
      (3) at least one of said metal compounds being a compound of a metal, the sulfide, oxide or metal form of which has catalytic hydrogenation activity,
      (4) at least one of said metal compounds being a metal chloride;
   (b) reducing the chloride content of the resulting coprecipitate to below about 0.25 percent of the total weight thereof;
   (c) drying the resulting coprecipitate to produce said coprecipitated solid; and
   (d) heat treating said coprecipitated solid by contact with an oxygen-containing gas stream at a temperature of 850° to 1600° F. for 0.25 to 48 hours.

2. The method as in claim 1 wherein said mixture of at least three different metal compounds contains a molecular sieve component.

3. The method as in claim 1, wherein at least one of said metal compounds is a compound of titanium.

4. The method as in claim 2 wherein said mixture of at least three different metal compounds contains a compound of nickel.

5. The method as in claim 4 wherein said mixture at least three different metal compounds contains a compound of tungsten.

References Cited

UNITED STATES PATENTS

| | | | |
|---|---|---|---|
| 3,210,293 | 10/1965 | O'Hara | 252—453 |
| 3,210,294 | 10/1965 | Chomitz et al. | 252—453 |
| 3,260,681 | 7/1966 | Sanford | 252—453 XR |
| 3,280,040 | 10/1966 | Jaffe | 252—439 |
| 3,401,125 | 9/1968 | Jaffe | 252—441 XR |

PATRICK P. GARVIN, Primary Examiner

U.S. Cl. X.R.

252—441, 442, 452, 453

UNITED STATES PATENT OFFICE
CERTIFICATE OF CORRECTION

Patent No. 3,523,912　　　　　Dated August 11, 1970

Inventor(s) JOSEPH JAFFE

It is certified that error appears in the above-identified patent and that said Letters Patent are hereby corrected as shown below:

Col. 9, lines 1-20, should read

--Solution components:　　　　　　　　　　　　　Parts by wt. of solution (b) Alkaline solution

| | |
|---|---|
| $WO_3$ | 12.6 |
| NaOH | 3.8 |
| $NH_4OH$ | 105 |
| $H_2O$ | 702 |

(B) Composition of final fresh Catalyst 3 prior to sulfiding

Component:　　　　　　　　　　　　　　　Parts by wt. of total catalyst

| | |
|---|---|
| NiO | 12.7 |
| $WO_3$ | 12.6 |
| $TiO_2$ | 10 |
| $Al_2O_3$ | 30 |
| $SiO_2$ | 34.7 -- |

SIGNED AND SEALED
NOV 24 1970

(SEAL)
Attest:

Edward M. Fletcher, Jr.
Attesting Officer

WILLIAM E. SCHUYLER, JR.
Commissioner of Patents